(No Model.)
E. D. WILCOX.
COOLER FOR BUTTER WORKERS.
No. 451,352. Patented Apr. 28, 1891.
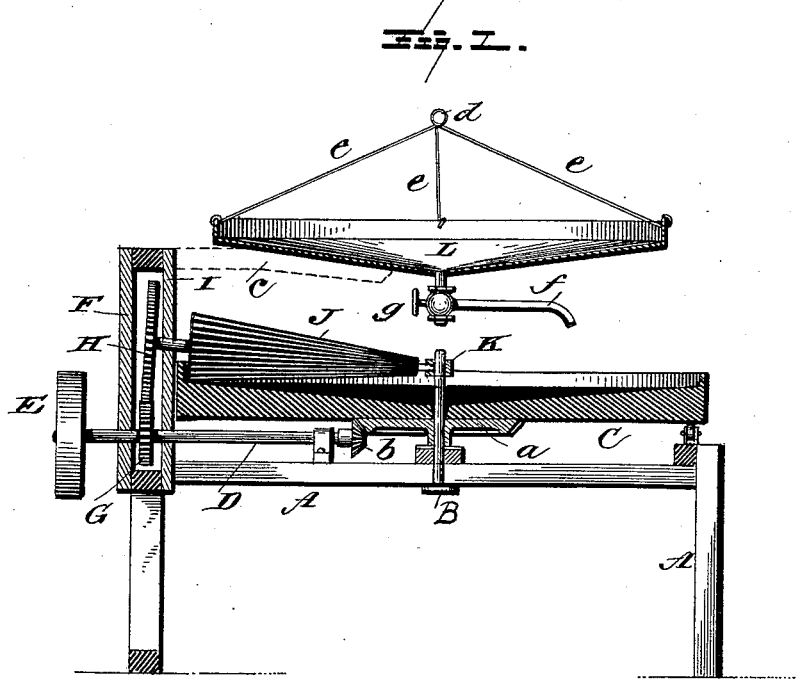
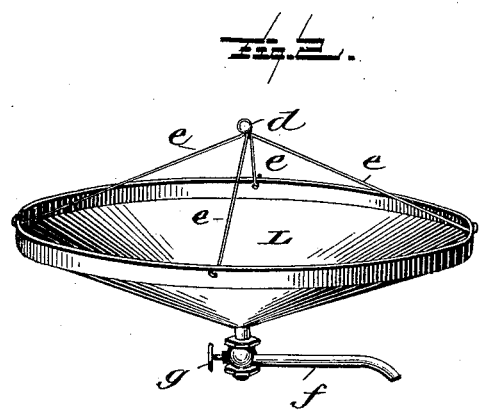
Witnesses
L. C. Hills.
E. H. Bond.
Inventor:
E. D. Wilcox,
E. B. Stocking
Attorney

UNITED STATES PATENT OFFICE.

EDSON D. WILCOX, OF CLARKSVILLE, IOWA.

COOLER FOR BUTTER-WORKERS.

SPECIFICATION forming part of Letters Patent No. 451,352, dated April 28, 1891.

Application filed October 4, 1890. Serial No. 367,093. (No model.)

*To all whom it may concern:*

Be it known that I, EDSON D. WILCOX, a citizen of the United States, residing at Clarksville, in the county of Butler, State of Iowa, have invented certain new and useful Improvements in Coolers for Butter-Workers, of which the following is a specification, reference being had therein to the accompanying drawings.

This invention relates to certain new and useful improvements in butter-making; and it has for its object to provide simple and efficient means for cooling the butter while it is being worked. It is very essential that butter should be worked without getting too soft and waxy, as this destroys both the grain and quality of the butter. I provide a receptacle above the worker, in which is placed some refrigerant, preferably salt and ice, which serves to cool the butter, and the brine formed by the melting of the ice is also utilized to aid in the cooling by allowing it to pass from the cooler onto the butter as it is worked. Thus both the cold air and the brine are utilized.

Other objects and advantages of the invention will hereinafter appear, and the novel features thereof will be specifically defined by the appended claim.

The invention is clearly illustrated in connection with one form of butter-worker in the accompanying drawings, which, with the letters of reference marked thereon, form a part of this specification, and in which—

Figure 1 is a vertical section through a butter-worker with my improvement applied. Fig. 2 is a perspective view of my cooler attachment removed.

Like letters of reference indicate like parts in both views.

Referring now to the details of the drawings by letter, A designates a suitable framing designed to support the butter-worker.

B is a vertical shaft held stationary, and on this shaft the concave circular plate C is designed to revolve. Motion is imparted to the said plate or dish in the following manner: *a* is a bevel-pinion on the under side of the plate and with which meshes the bevel-pinion *b* on the inner end of the horizontal shaft D, which is journaled in suitable bearings and to which is affixed the drive-pulley E. Roller-bearings may be provided, if desired, for the plate C to revolve on, as seen in Fig. 1.

At one end of the framing is a housing F, in which are arranged the gear-wheels G and H, the former carried by the shaft D and the other by a shaft I, the two gear-wheels being designed and arranged to mesh with each other. On the shaft I is the fluted roller J of known construction, there being one, two, or more, as deemed best. The inner end of the roller shaft or shafts has a bearing in the plate or disk K on the upper end of the vertical shaft B, as seen in Fig. 1. This form of butter-worker is but one of the many forms with which the principle of my invention may be employed. Its operation will be readily understood.

L is a receptacle of any desired shape, preferably like that shown—that is, an inverted cone. It may be supported above any worker in any suitable manner—as, for instance, by a lateral support, as *c*, (shown by dotted lines in Fig. 1,) or by cords or chains (not shown) connected with the loop *d*, formed by the wires or cords *e*, which are secured to the surrounding flange of the cooler-receptacle. This receptacle is arranged with its lowest point a short distance above the plate C, and at the apex of the cone I provide an outlet connected with the pipe *f* and having a controlling-valve *g*, as shown in both views.

In operation ice and salt are placed in the receptacle L, and the cold air thus produced serves to keep the butter cool while it is being worked. As brine is formed by the melting of the ice, it is allowed to flow through the pipe onto the butter and aids in keeping it cool.

From actual tests butter worked while being kept cool in this manner has proved far superior to all others.

It is deemed important that the receptacle L be suspended above the cooler, as by the cords *e*, as shown, so that it may be partially rotated to distribute the liquid over different portions of the cooler, and, furthermore, the suspension of the receptacle lessens the liability to injury to the receptacle and its discharge-pipe by anything coming in contact therewith.

What I claim as new is—

The combination, with a suspended inverted-cone-shaped refrigerant-receptacle having valve-controlled discharge-pipe extending from the apex of the cone, of a butter-working table of similar shape, arranged centrally beneath the suspended receptacle, substantially as shown and described.

In testimony whereof I affix my signature in presence of two witnesses.

EDSON D. WILCOX.

Witnesses:
BERT HUNT,
FRED SEITZ.